United States Patent

[11] 3,611,134

[72] Inventor Allen W. McDowell
      Ulster, N.Y.
[21] Appl. No. 820,367
[22] Filed Apr. 30, 1969
[45] Patented Oct. 5, 1971
[73] Assignee International Business Machines
      Corporation
      Armonk, N.Y.

[54] APPARATUS FOR AUTOMATICALLY MEASURING TIME INTERVALS USING MULTIPLE INTERPOLATIONS OF ANY FRACTIONAL TIME INTERVAL
12 Claims, 5 Drawing Figs.

[52] U.S. Cl. .................................................. 324/187
[51] Int. Cl. .................................................. G04f 9/00, G04f 11/06
[50] Field of Search .................................. 324/68, 83 D; 328/129

[56] References Cited
UNITED STATES PATENTS
2,665,411  1/1954  Frady ........................... 324/68
2,738,461  3/1956  Burbeck et al. .............. 324/187

Primary Examiner—Alfred E. Smith
Attorneys—Edwin M. Thomas, Ralph L. Thomas and Thomas & Thomas ABSTRACT: An apparatus for measuring a time interval between first and second pulses includes a counter which counts pulses from a first oscillator which is turned on by the first pulse. When the second pulse occurs a second oscillator operates a second counter to determine the fractional time interval, if any, resulting whenever the second pulse occurs between pulses of the first oscillator. A coincidence detector arrangement determines when the first and second oscillators are in phase. At such time the second oscillator is stopped for a fixed period of time, and then it is connected to a third counter for another vernierizing operation. Successive vernierizing operations may be performed by connecting the second oscillator to successive counters in turn under control of the coincidence detector arrangement.

APPARATUS FOR AUTOMATICALLY MEASURING TIME INTERVALS USING MULTIPLE INTERPOLATIONS OF ANY FRACTIONAL TIME INTERVAL

BACKGROUND OF THE INVENTION

This invention relates to apparatus for measuring time intervals and more particularly to such apparatus for performing multiple interpolations.

In some of the earlier arrangements for automatically measuring a time interval, the interval being defined by the lapse of time between first and second pulses, a first oscillator is turned on by the first pulse, and the pulses are counted by a first counter. If the time interval is not equal exactly to a multiple number of cycles of the first oscillator, a fractional portion of the cycle of the first oscillator must be measured and this measure is made by a second or vernier oscillator. The vernier oscillator is turned on by the second pulse, and its pulses are counted in a second counter until the two oscillators reach coincidence. Alternatively, the first oscillator may be free running and vernier interpolation may be utilized for estimating fractional counts at the beginning and end of the timed period. This requires a vernier oscillator for each of the two interpolations unless the timed period is long enough to permit timing out of the beginning interpolation before the end interpolation is undertaken. Moreover, the smallest increment of the measurement remaining is the simple difference between the main and vernier oscillator periods of oscillation.

SUMMARY OF THE INVENTION

It is a feature of this invention to provide an improved arrangement for automatically measuring a time interval more accurately.

It is a further feature of this invention to measure automatically the time interval between a pair of signals with greater accuracy by using a main oscillator and a vernier oscillator to perform multiple successively finer interpolations.

It is a feature of this invention to provide an improved arrangement for measuring the time interval between a pair of signals by using a main oscillator with a first counter to count the number of whole cycles of the main oscillator and a single vernier oscillator which performs two or more vernierizing operations with two or more additional counters to determine successively lower order parts of a fractional period of the main oscillator.

It is a further feature of this invention to provide an apparatus for measuring the time interval between a pair of signals wherein the time interval T includes a unit time interval $T_0$ which is determined by counting pulses from a main oscillator and a plurality of fractional time intervals $T_1$, $T_2$, $T_3$, etc., which are obtained by counting pulses from a single vernier oscillator in successive vernierizing operations.

In a preferred arrangement according to this arrangement a plurality of counters are employed, and a control stage is provided for each counter. A first or main oscillator is connected through the associated control stage to the first counter, and it determines the number of whole counts in the unit time interval $T_0$. A second or vernier oscillator is connected to the remaining control stages. A phase coincidence detector receives pulses from both of the oscillators, and it is connected to a switch mechanism such as a ring circuit. Various stages of the ring circuit are connected to given control stages whereby each control stage may be operated in turn for determining successively lower order fractions $T_1$, $T_2$, etc., in the time interval $T_0$. The output of the phase coincidence detector is supplied also to the vernier oscillator, and the vernier oscillator is stopped between vernierizing operations.

A time interval to be measured is defined by first and second pulses. The first pulse starts the main oscillator and activates the first control stage whereby pulses from the main oscillator are counted in real time in the first counter. When the second pulse arrives, thereby terminating the time interval under measurement, the first control stage is deactivated, the vernier oscillator is started, and the control stage associated with the second counter is activated whereby pulses from the vernier oscillator are counted by the second counter which determines the fractional time interval $T_1$. When the phase coincidence detector signal rises, vernier stops the vernier oscillator, vernier the second control stage, and after a fixed time delay it advances the switch mechanism which in turn activates the third control stage and starts the vernier oscillator whereby the third counter counts pulses from the vernier oscillator to determine the fractional time interval T2. Successive vernierizing operations may be performed. When the last vernierizing operation is terminated, the main oscillator is turned off, and the measurement of the time interval is finished. The time during which the second and subsequent counters are operated takes place in what may be called expanded time where this term indicates the lapse of a relatively long period of time during which vernierizing operations take place to determine relatively small fractional time intervals.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
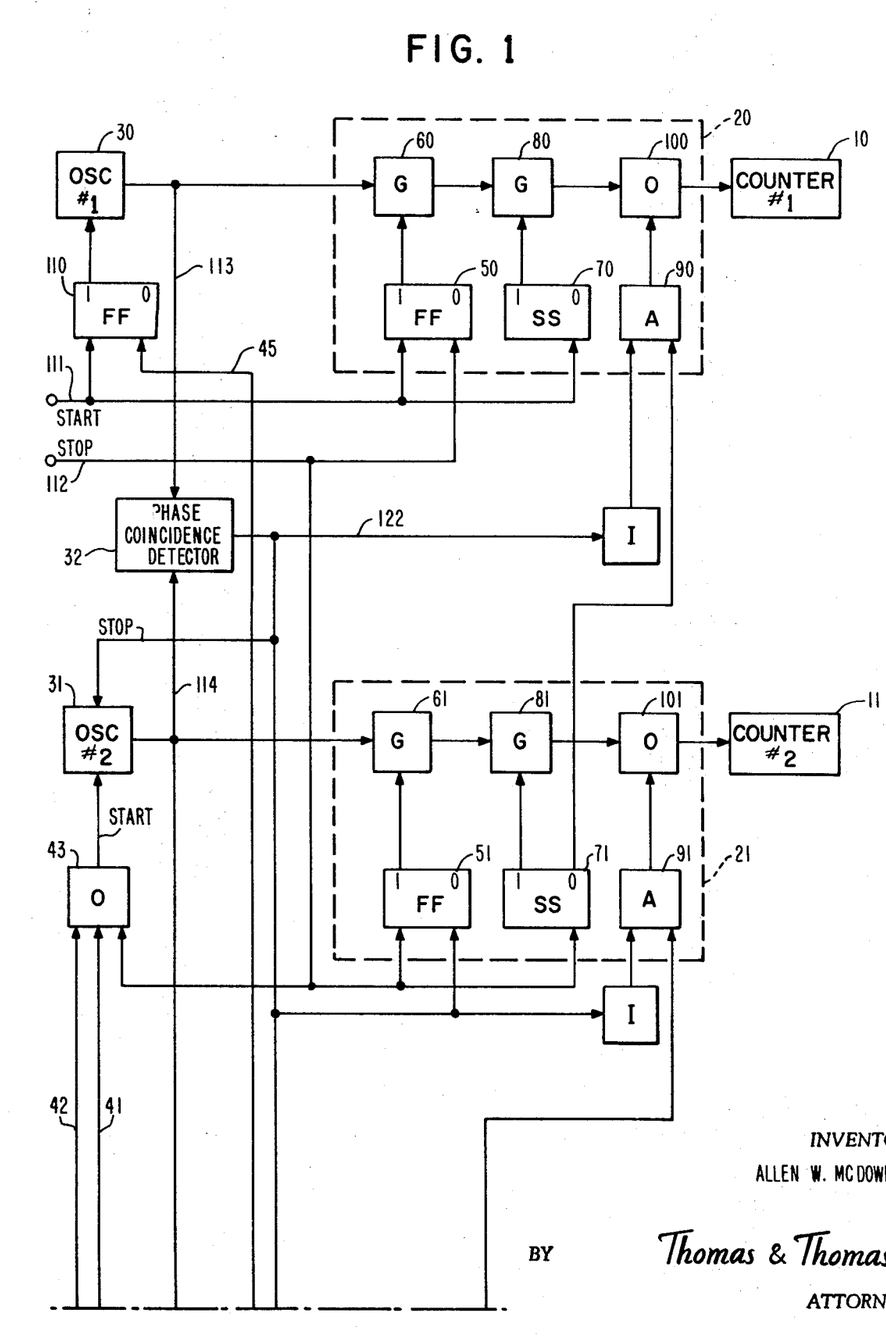
FIGS. 1 and 2 illustrate in block form a system according to this invention for automatically measuring a time interval.
Figure 2:
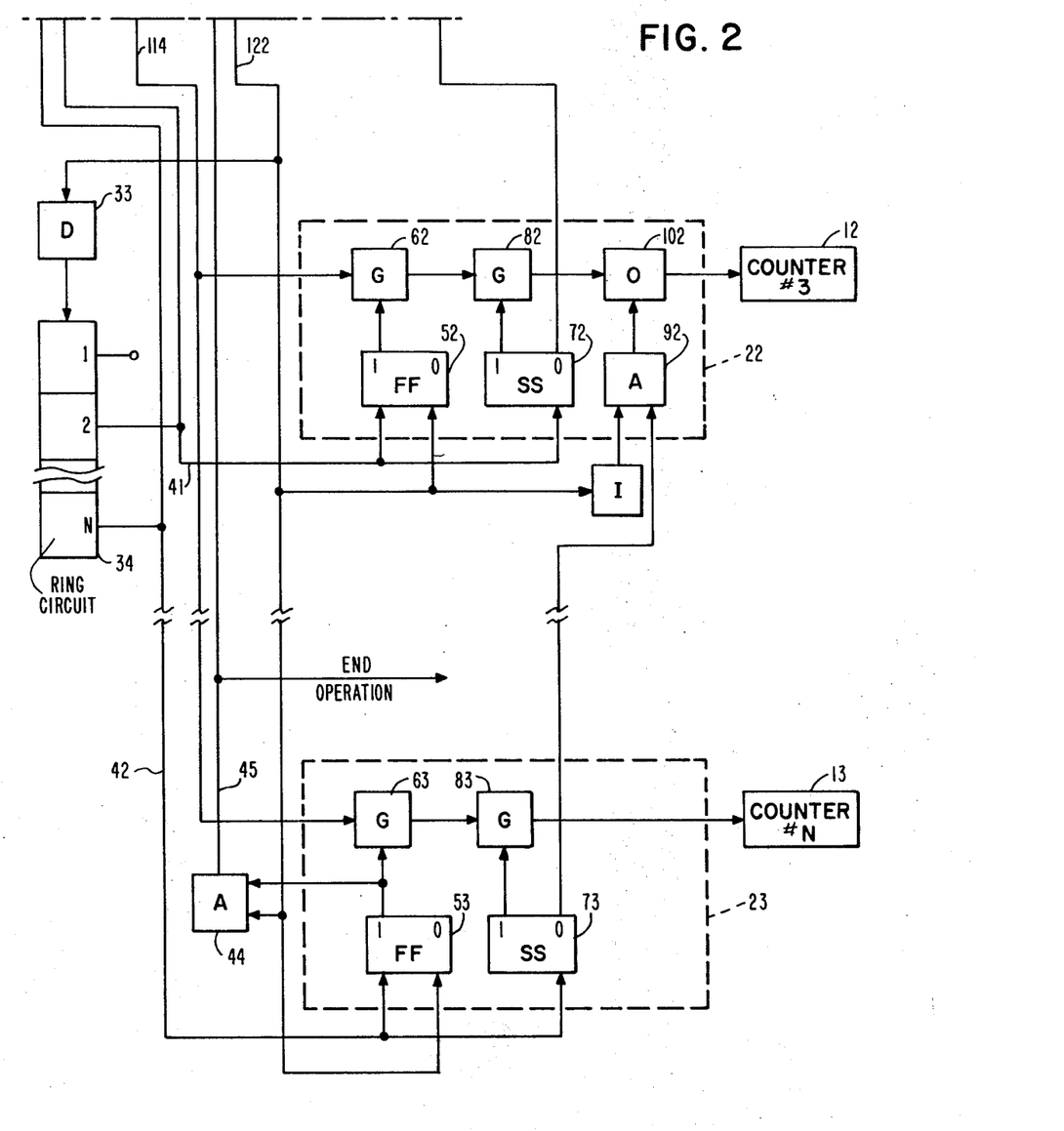
Figures 3, 4:
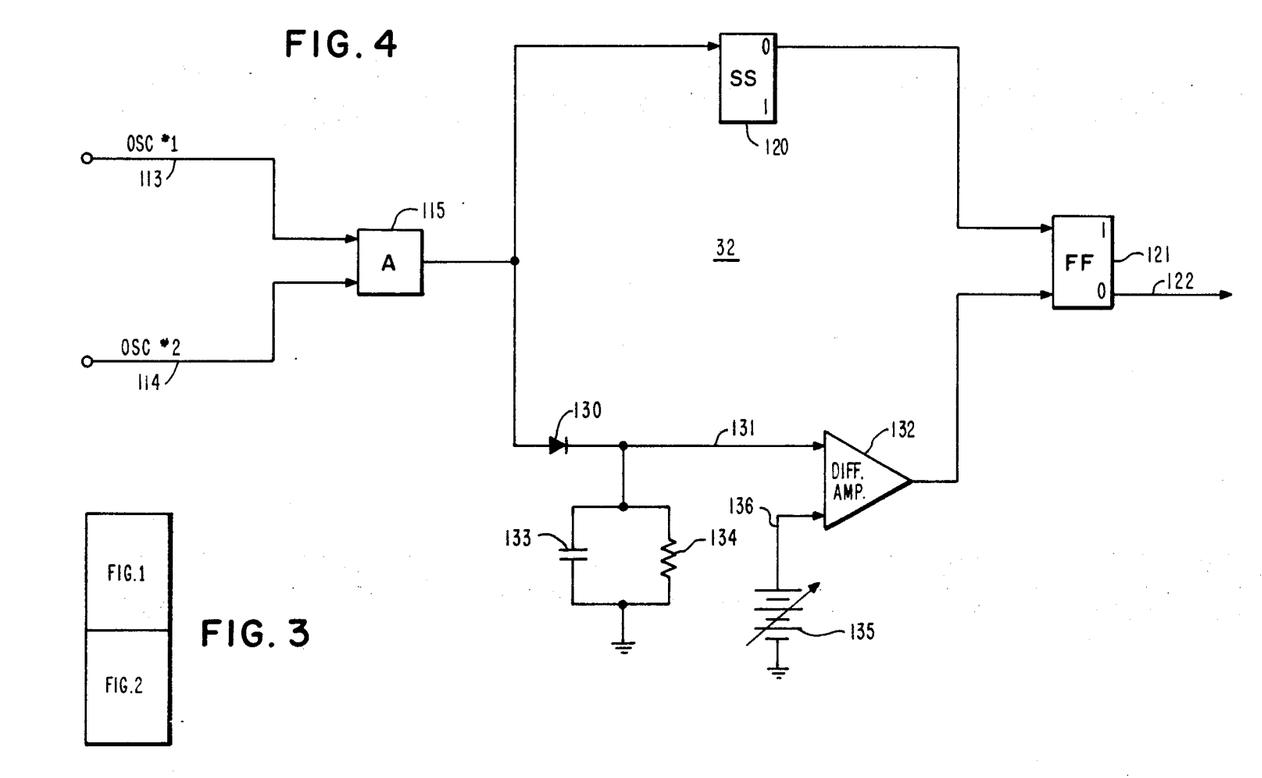
FIG. 3 illustrates the manner in which FIGS. 1 and 2 should be arranged with respect to each other.
FIG. 4 illustrates in detail the phase coincidence detector shown in block form in FIG. 1.

Reference is made to FIGS. 1 and 2 which illustrate a counter arrangement according to this invention. FIGS. 1 and 2 should be arranged with respect to each other as illustrated in FIG. 3. A plurality of counters 10 through 13 are provided. A plurality of control stages 20 through 23 control the passage of pulses to the respective counters 10 through 13. A main oscillator 30 and a vernier oscillator 31 provide pulses for operating the various counters. A phase coincidence detector 32 responds to signals from both oscillators, and when the oscillator signals are in phase, a distinctive output signal is provided to the control stages 20 through 23, the oscillator 31, and through a delay circuit 33 to a ring circuit 34. The ring circuit is provided with three stages in the arrangement shown, and stages 2 and N provide output signals on the respective lines 41 and 42 to an OR circuit 43. The lines 41 and 42 are connected to respective control stages 22 and 23. An AND circuit 44 in FIG. 2 is provided for terminating a counting operation, and its operation is described more fully hereinafter.

The control stages 20 through 23 include associated flip-flops 50 through 53, and their one output sides are connected to corresponding gates 60 through 63. The control stages 20 through 23 also include associated single shots 70 through 73, and their zero output sides are connected to respective gates 80 through 83. The control stages 20 through 22 include associated And circuits 90 through 92 which are connected to respective Or circuits 100 through 102. The OR circuits 100 through 102 are connected to respective counters 10 through 12. The output of the gate 83 in FIG. 2 is connected directly to the counter 13.

A flip-flop 110 in FIG. 1 controls the oscillator 30. The oscillator 30 is operated when the flip-flop 110 is set in the one binary state by a positive signal on the input line 111. The oscillator 30 is turned off when the flip-flop 110 is reset to the zero state by a positive signal on the line 45 from the And circuit 44 at the end of a counting operation.

When a given time interval is to be measured, its commencement is represented by the leading edge of a positive signal applied to the line 111, and the termination of the time interval is represented by the leading edge of a positive signal on the line 112. The given time interval is measured by summing the content of the counters 10 through 13. The counter 10 is operated in real time during the occurrence of the time interval to be measured, and the counters 11 thru 13 are operated in expanded time after termination of the time interval to be measured.

Reference is made next to FIG. 4 which illustrates in detail the phase coincidence detector 32 which is shown in block form in FIG. 1. Signals from the oscillator 30 are supplied on the line 113 and to an AND circuit 115, and signals from the oscillator 31 are supplied on the line 114 to the AND circuit 115. When both input signals to the AND circuit 115 are positive, the AND circuit provides a positive output signal, and if either of the input signals is negative, the AND circuit 115 provides a negative output signal. Output signals from the AND circuit 115 are supplied to the zero input side of a single shot 120. Positive signals from the AND circuit 115 force the single shot 120 into the binary zero state which is its unstable state. As long as positive signals are received at the zero input of the single shot 120, it remains in the zero state, and a positive signal from the binary zero output side is supplied to the binary one input side of a flip-flop 121. The single shot 120 serves as a digital integrator. This sets the flip-flop 121 to the binary one state, and a negative output signal appears on the line 122 from the zero output side of this flip-flop. The output signal from the AND circuit 115 in FIG. 4 is connected also through a diode 130 to a differential amplifier 132. A condenser 133 and a resistor 134 serve as an analog integrator. A variable bias source in the form of a battery 135 is connected as a second input to the differential amplifier 132. Positive signals from the AND circuit 115 are passed by the diode 130, and they charge up the condenser 133. The condenser 133 and the resistor 134 serve to average or integrate the positive signals from the AND circuit 115, and the averaged value of these signals is supplied on the line 131 to the differential amplifier 132. Whenever the signal on the input line 131 is more positive than the signal on the input line 136, the differential amplifier 132 provides a negative output signal. Whenever the positive signal level on the line 131 becomes equal or less than the bias signal level on the line 136, the differential amplifier 132 provides a positive output signal. This positive output signal is supplied to the zero input side of the flip-flop 121 which resets this flip-flop, and the flip-flop 121 then provides a positive output signal on the line 122. The condenser 133 and the resistor 134 serve as an analog integrator which activates the phase coincidence detector, and the single shot 120 serves as a digital integrator which deactivates the phase coincidence detector.

The basic function performed by the counting arrangement in FIGS. 1 and 2 is that of measuring a time interval which commences with the leading edge of a positive start pulse on the line 111 and terminates with the leading edge of a positive stop pulse on the line 112 in FIG. 1. A description of the operation of the system in FIGS. 1 and 2 is given next.

A positive start pulse on the line 112 sets the flip-flops 50 and 110 in FIG. 1 and resets the single shot 70. When the flip-flop 110 is set to the one state, a positive output signal from the one output side causes the oscillator 32 to supply pulses on the line 113 to the phase coincidence detector 32 and the gate 60. The phase coincidence detector does not receive pulses from the oscillator 31 at this time, and the output signal therefrom on the line 122 is a positive level. This positive level conditions the associated input to the AND circuit 90 in FIG. 1 the oscillator pulses supplied to the gate 60 are passed to the gate 80 because the flip-flop 50 is in the one state, thereby supplying a positive signal to the gate 60. The single shot 70, however, is reset to the zero state, its unstable state, and the gate 80 is deconditioned by a negative signal level from the one output side of the single shot 70. The single shot 70 remains in its unstable zero state for a time period approximately equal to one cycle of the oscillator 30. Consequently, the first oscillator pulse from the oscillator 30 is not passed by the gate 80. However, the single shot 70 automatically resets to the one state by the time the second pulse from the oscillator 30 is generated, and the single shot 70 then conditions the gate 80. Therefore, the second and subsequent pulses from the oscillator 30 pass through the gates 60 and 80 to the Or circuit 100 which in turn passes such pulses to the counter 10. The second and subsequent pulses from the oscillator 30 advance the counter 10, and the counter is advanced by successive pulses from the oscillator 30 until a positive stop signal is received on the line 112 in FIG. 1. At such time the flip-flop 50 is reset which establishes a negative signal on its one output side that deconditions the gate 60 and prevents the passage of further pulses from the oscillator 30 to the counter 10. The positive stop signal on the line 112 is supplied also to the one input side of the flip-flop 51, the zero input side of the single shot 71, and the OR circuit 43 in FIG. 1. The positive signal is passed by the OR circuit 43 to the oscillator 31, and the oscillator thereby is operated to supply pulses on the line 114 to the gate 61. The positive pulse on the line 112 sets the flip-flop 51, and its one output side supplies a positive signal which conditions the gate 61 to pass positive pulses from the oscillator 31. The positive pulse on the line 112 resets the single shot 71, and its one output side supplies a negative signal which deconditions the gate 81. The single shot 71 remains in the zero state for a period of time equal approximately to one cycle of the oscillator 31. Therefore, the gate 81 does not pass the first positive pulse from the oscillator 31. The single shot 71 reverts to its set state automatically by the end of the first cycle of the oscillator 31, and its one output side supplies a positive signal which conditions the gate 81 to pass the second and subsequent positive pulses from the oscillator 31. These pulses pass through the OR circuit 101 to the counter 11, and the counter is advanced by successive pulses from the oscillator 31. Pulses from the oscillator 31 continue to advance the counter 11 until the oscillator 31 is stopped by a positive signal from the phase coincidence detector 32. The phase coincidence detector 32 supplies a negative output signal when the oscillator 30 and 31 are out of phase, and it supplies a positive signal on the line 122 when the phase difference of the two oscillators becomes zero. At such time the positive signal on the line 122 stops the oscillator 31 and resets the flip-flop 51 thereby to decondition the gate 61. The positive signal on the line 122 is supplied also through the delay circuit 33 in FIG. 2 to the ring circuit 34, and the ring circuit is advanced from the first to the second stage. The ring circuit then provides a positive signal on the line 41 to the OR circuit 43 which in turn passes this signal to the oscillator 31. This causes the oscillator 31 to operate again. The positive pulse on the line 41 sets the flip-flop 52 in FIG. 2 and resets the single shot 72. This conditions the gate 62 so that positive oscillator pulses on the line 114 are supplied through the gate 62 to the gate 82. The single shot 72 deconditions the gate 82, and this inhibits the passage of the first positive pulse from the oscillator 31. The single shot automatically sets by the end of the first cycle of the oscillator 31, and the second and subsequent pulses pass through the gate 62, the gate 82, and the OR circuit 102 to the counter 12. The counter 12 counts successive pulses from the oscillator 31 until the phase coincidence detector 32 again determines that the oscillators 30 and 31 are in phase, and it then supplies a positive signal on the line 122. At such time the positive signal on the line 122 resets the flip-flop 52 and deconditions the gate 62, thereby inhibiting the passage of any further pulses from the oscillator 31 to the counter 12. The positive signal on the line 122 stops the oscillator 31. The positive signal on the line 122 is supplied through the delay circuit 33 in FIG. 2 to the ring circuit 34. The ring circuit 34 advances from stage 2 to stage N. The ring circuit 34 then supplies a positive signal on the line 42 which is passed by the OR circuit 43 in FIG. 1 to start the oscillator 31 again. The positive signal on the line 42 is supplied to the one input side of flip-flop 53 and the zero input of the single shot 73. The first pulse from the oscillator 31 is passed by the gate 63. However, this pulse is blocked by the gate 83 because the single shot 73 is reset to the zero state at this time, and it supplies a negative signal from the one output side which deconditions the gate 83. By the end of the first cycle of the oscillator 31 the single shot 73 is automatically set, and it supplies a positive signal from the one output side which conditions the gate 83 to pass the second and subsequent positive pulses from the oscillator 31. These pulses are supplied to the counter 13, and the counter is advanced by successive pulses until the phase detector 32 in FIG. 1 determines that the oscillators 30 and 31 are in phase. At this time phase coincidence detector 32 supplies a positive signal on the line 122 which resets the flip-flop 53, and it supplies a negative signal from the one output side which deconditions the gate 63. The positive signal on the line 122 is supplied also through the delay circuit 33 to the ring circuit 34, and the ring circuit is advanced from stage N to stage 1. A positive signal is supplied at the output of stage 1, but it is not used. With stage 1 set and the remaining stages reset, the ring circuit is in the reset condition. The positive signal on the line 122 is supplied also to the AND circuit 44 in FIG. 2, and for a short time this AND circuit simultaneously receives a positive output signal from the one output side of the flip-flop 53. The AND circuit 44 supplies a positive pulse on the line 45 which resets the flip-flop 110 in FIG. 1. It is pointed out that the positive output signal from AND circuit 44 is of brief duration, and its width is determined by the time required to set the flip-flop 53. The output from the AND circuit 44 is used to end the counting operation, and it may be used for other purposes such as transferring the content of the various counters 10 through 13 to other equipment.

The AND circuits 90 through 92 in respective control stages 20 through 22 serve an "add-one" function. This function is provided to remove ambiguities which would otherwise exist when coincidence signals rise at even multiples of the oscillator 01 signals. The AND circuit 90 responds to the inverse of a positive signal from the phase coincidence detector 32 on the line 122 and a positive signal from the zero output side of the single shot 71 of the control stage 21, and the AND circuit 90 provides a positive output signal which is passed by the OR circuit 100 to advance the counter 10 by the value of one count. It should be noted that this occurs only if a signal sufficient to fire single shot 120 occurs during the window provided by single shot 71. The AND circuit 91 in the control stage 21 responds to the inverse of single on the line 122 and a positive signal from the zero output side of the single shot 72 in the control stage 22, and the AND circuit 91 supplies a positive output signal through the OR circuit 101 to advance the counter 11 by the value of one count. The AND circuit 92 in FIG. 2 responds to the inverse of a positive signal on the line 122 and a positive from the zero output side of the single shot 73 in the control circuit 23, and the AND circuit 92 passes a positive signal through the OR circuit 102 to advance the counter 12 by the value of one count. The counter 10 is advanced by the value of one count with the positive pulse from the AND circuit 90 after the control stage 21 is activated. The counter 11 is advanced by the value of one count with the positive pulse from the AND circuit 91 after the control stage 22 is activated. The counter 12 is advanced by the value of one count with the positive pulse from the AND circuit 92 after the control stage 23 is activated.

In order to illustrate more precisely the operation of the counter system according to this invention, let it be assumed that a time interval of 204.05 units is to be measured. The oscillator 30 and the oscillator 31 have different frequencies. The greater the difference in the frequencies, the more rapidly the two oscillators approach the point of being in phase. Stated alternatively, as the frequency difference between the two oscillators becomes less and less, the longer it takes for them to reach the in phase condition. There are a wide range of choices in the selection of the frequencies of the oscillators. It is pointed out that as the time interval to be measured becomes shorter in duration, the frequencies of the oscillators preferably are increased in order to obtain greater accuracy in the measurement. Thus for some applications the frequencies of the oscillators may be in the kilocycle ranges; whereas, for other applications the frequencies of the oscillators may be in the megacycle range or even higher, depending on the particular application. If, for example, the time interval of 204.05 units represents nanoseconds, then the oscillator 30 may have a frequency of 10 megahertz, and the oscillator 31 may have a frequency of 10.1 megahertz.

Figure 5:
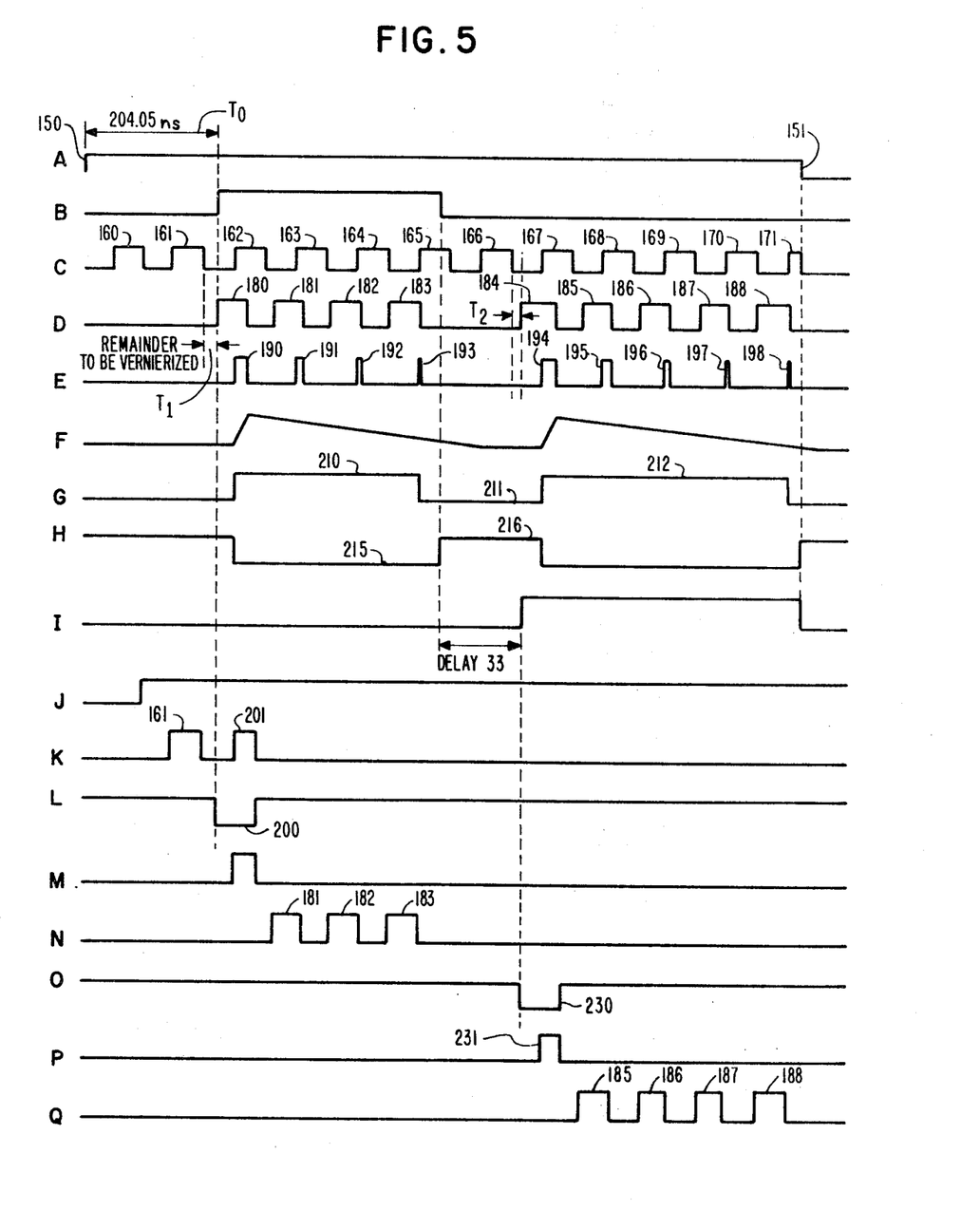
FIGS. 5A through 5Q show waveforms which are helpful in describing the operation of the system in FIGS. 1 and 2.

Reference is made to FIG. 5 which shows the waveforms of the various circuits in FIGS. 1 and 2 when a time interval of 204.05 units is measured. This interval of time is depicted in FIG. 5A and it occurs between a first pulse on the line 111 and a second pulse on the line 112 in FIG. 1. The commencement of the time interval to be measured is represented by a positive pulse on the line 111 in FIG. 1, and this pulse sets the flip-flop 110 to the one state. The positive signal established on its one output side to the oscillator 30 is shown in FIG. 5A. The leading edge 150 in FIG. 5A defines the commencement of the time interval to be measured. The positive level from the one output side of the flip-flop 110 in FIG. 1 continues until the termination of the counting operation of the system in FIGS. 1 and 2, and the main oscillator 30 runs during this period. The termination of the counting operation takes place at the time indicated by the trailing edge 151 of the positive pulse in FIG. 5A, and this transition takes place when the flip-flop 110 in FIG. 1 is reset by a positive signal from the AND circuit 44 in FIG. 2.

When the flip-flop 110 is in the one state, the oscillator 30 is turned on, and the pulses from the oscillator 30 are illustrated in FIG. 5C as pulses 160 through 171. These pulses are supplied to the gate 60 in FIG. 1 and the phase coincidence detector 32. Since the oscillator 31 is not operated at this time, the phase coincidence detector 32 supplies a positive signal level on its output line 122 as illustrated in FIG. 5H. The positive signal on the line 122 in FIG. 1 and FIG. 2 resets the flip-flops 51 through 53 in respective control stages 21 through 23, and this inhibits any counting operations in the vernier counters 10 through 13.

The positive start pulse on the line 111 in FIG. 1 sets the flip-flop 50 and resets the single shot 70. The signal from the one output side of the flip-flop 50 conditions the gate 60 to pass pulses from the oscillator 30, and this gate passes the pulses 160 and 161 in FIG. 5B. The positive start pulse on the line 111 resets the single shot 70 to its zero or unstable state. Consequently, a negative signal from the one output side of the single shot 70 deconditions the gate 80 for one cycle of the oscillator 30. This is shown in FIG. 5J. As a result the pulse 160 in FIG. 5C is not passed by the gate 80 in FIG. 1. At or subsequent to the trailing edge of the pulse 160 in FIG. 5C the single shot 70 in FIG. 1 returns to its stable binary one state, ad shown in FIG. 5J, and the gate 80 in FIG. 1 passes subsequent pulses from the oscillator 30. In this instance it passes the pulse 161 in FIG. 5C through the OR circuit 100 in FIG. 1 to the counter 10. This positive pulse advances the counter from a zero setting to the value of one.

A positive stop pulse occurs on the line 112 in FIG. 1, and it occurs between the oscillator pulses 161, and 162 in FIG. 5C. The positive stop pulse on the line 112 resets the flip-flop 50, and this establishes a negative signal level from the one output which deconditions the gate 60 and inhibits the passage of further pulses from the oscillator 30 through the gate 60. The positive pulse on the line 112 is supplied through the OR circuit 43 in FIG. 1, and it starts the oscillator 31 which then supplies positive pulses on the output line 114. The leading edge of the stop pulse on the line 112 is substantially identical to the leading edge of the first pulse from the oscillator 31, and this pulse is the pulse 180 in FIG. 5D. The positive stop pulse on the line 112 sets the flip-flop 51 in FIG. 1 and resets the single shot 71. The control stage 21 thereby is conditioned, and the counter 11 is incremented subsequently. However, the add one function performed by the AND circuit 90 for the control stage 20 takes place at this time. The positive output signal from the phase coincidence detector 122 continues, as shown in FIG. 5H, until the pulse 190 in FIG. 5E occurs. The inverse of the level on line 122 is supplied to AND circuit 90, and the AND circuit 90 receives a positive signal from the zero output side of the single shot 71 which is reset at this time. The one output side of the single shot 71 is a negative level as shown by the negative pulse 200 in FIG. 5L. It is during the negative pulse 200 that the zero output side of the single shot 71 provides a positive level to the AND circuit 90. Consequently, the AND circuit 90 supplies a positive pulse to the OR circuit 100, and this positive pulse is shown in FIG. 5M. The OR circuit 100 in FIG. 1 passes this positive pulse, shown as pulse 201 in FIG. 5K, to the counter 10, and it is incremented from the value of one to the value of two. It is pointed out that the counter 10 is operated in real time.

An increment of time must be vernierized in order to measure precisely the time interval between the start pulse supplied to the line 111 in FIG. 1 and the stop pulse supplied to the line 112. The incremental time period is shown between FIGS. 5D and 5E, and it lies between the trailing edge of the pulse 161 in FIG. 5C and the leading edge of the pulse 180 in FIG. 5D. To vernierize or interpolate this time increment is the function of the counters 11 through 13.

The pulse 190 in FIG. 5E originates in the AND circuit 115 in FIG. 4. The pulse 190 represents the period of time that the oscillator pulse 162 in FIG. 5C is positive and the oscillator pulse 180 in FIG. 5D simultaneously is positive. The pulse 190 represents the overlapped portions of the oscillator pulses. The positive pulse 190 is supplied to the zero input side of the single shot 120 in FIG. 4. The output signal from the zero output side of the single shot 120 is represented by the waveforms in FIG. 5G. The positive output signal from the single shot 120 is represented by the pulse 210 in FIG. 5G. This positive signal is supplied to the one input side of the flip-flop 121, and this flip-flop is set to the one state. As a result the signal from the zero output side of the flip-flop 120 on the line 122 changes from a positive to a negative level, and this is indicated by the negative pulse 215 in FIG. 5H. As soon as the single shot 71 in FIG. 1 returns to its stable binary one state, as represented by the termination of the negative pulse 200 in FIG. 5L, the counter 11 in FIG. 1 commences to receive pulses from the oscillator 31. The pulse 180 in FIG. 5D from the oscillator 31 is inhibited by the single shot 71 as previously explained. However, the pulses 181 through 183 in FIG. 5C from the oscillator 31 are passed through the gate 61, the gate 81, and the OR circuit 101 to the counter 11. The pulses supplied to the counter 11 are shown in FIG. 5N, and they are labeled 181 through 183. These pulses successively advance the counter 11 from the count of zero to the count of three.

As the pulses 181 through 183 increment the counter 11, they also operate the AND circuit 115 FIG. 4 in conjunction with pulses from the oscillator 30. The output from the AND circuit 115 is a sequence of pulses 190 through 193, and each is successively narrower than the preceding one. The pulse 193 is so narrow that it is not able to reset the single shot 120 in FIG. 4 and hold it in the unstable binary zero state. Consequently, the positive pulse 210 in FIG. G terminates as the single shot 120 reverts to the stable binary one state. This causes a negative signal level to be supplied from the zero output side of the single shot 120 to the one input side of the flip-flop 121. This negative signal is represented by the pulse 211 in FIG. 5G. The pulses 190 through 193 in FIG. 5E are supplied through the diode 130 in FIG. 4 to the analog integrator circuit including the condenser 133 and the resister 134. These pulses charge the condenser 133. The signal from the analog integrator is shown in FIG. 5F. The pulse 190 is the first to charge the condenser 133, and it provides the greatest charge. Each succeeding pulse provides progressively smaller charges. The condenser discharges through the resister 134 at a rate determined by the RC time constant. The successive pulses 191 through 193 add successively smaller incremental charges to the condenser 133.

Since the condenser 133 is constantly discharged and since each succeeding pulse supplies a progressively smaller charge, it follows that the average charge on the condenser is reduced with time. The waveform in FIG. 5F is idealized in the interest of simplicity to indicate the integrated or average charge with respect to time. When the condenser 133 is discharged sufficiently by the resister 134 such that the positive signal level on the line 131 is less than the positive signal level on the line 136, then the output signal from the differential amplifier 132 changes from a negative signal level to a positive signal level. The positive signal level from the differential amplifier 132 resets the flip-flop 121, and a positive signal level appears on the line 122. This is represented by the positive pulse 216 in FIG. 5H.

The positive signal on the line 122 in FIG. 1 resets the flip-flop 51, and the positive pulse from the one output side of the flip-flop 51, shown in FIG. 5B, is terminated. The positive signal level on the line 122 conditions one input to the AND circuit 91 and stops the oscillator 31. The positive signal level on the line 122 is supplied through the delay circuit 33 to the ring circuit 34. The delay circuit 33 permits sufficient time delay for the oscillator 31 to discharge and recover before it is started again. This delay is illustrated in FIG. 5I.

The ring circuit 34 is advanced from stage 1 to stage 2, and it supplies a positive pulse on the line 41 which sets the flip-flop 52, resets the single shot 72, and passes through the OR circuit 43 and restarts the oscillator 31. When the flip-flop 52 in FIG. 2 is set, it supplies a positive signal from its one output side. This positive signal is shown in FIG. 5I, and it conditions the gate 62 to pass positive pulses from the oscillator 31. The single shot 72, being temporarily reset to the unstable binary zero state, supplies a negative output signal from the binary one output side which deconditions the gate 82. The negative signal from the binary one output side is shown as a negative pulse 230 in FIG. 5O. The positive signal from the binary zero output side of the single shot 72, coincident in time with pulse 230, is supplied to the AND circuit 91 in FIG. 1. The other input to the AND circuit 91 is the positive signal 216 in FIG. 5H on the line 122 from the phase coincidence detector 32. Consequently, the AND circuit 91 in FIG. 1 supplies a positive signal through the OR circuit 101 to the counter 11, thereby advancing this counter from the value of 3 to the value of 4. The positive signal from the AND circuit 91 is shown as a pulse 231 in FIG. 5P. It is seen that the AND circuit 91 performs its add one function after the delay occasioned by the delay circuit 33 in FIG. 2.

The first pulse 184 in FIG. 5D from the oscillator 31 is not passed by the gate 82 in FIG. 2, and it is lost. The single shot 72 in FIG. 2 automatically sets to the stable binary one state prior to the arrival of the second oscillator pulse 185 in FIG. 5D. The second and subsequent pulses 185 through 188 in FIG. 5D from the oscillator 31 in FIG. 1 are passed by the gate 62, the gate 82, and the OR circuit 102 to the counter 12, and these pulses are shown in FIG. 5Q. The counter 12 is advanced successively from zero to a count of four. When the phase coincidence detector 32 detects phase coincidence between the pulses of the oscillators 30 and 31, the positive signal it supplies on the line 122 resets the flip-flop 52 in FIG. 2 and conditions the AND circuit 92. The positive signal on the line 122 advances the ring circuit in the manner previously explained, and it supplies a positive signal on the line 42 which sets the flip-flop 53 and resets the single shot 73 in FIG. 2. The positive signal from the zero output side of the single shot 73 conditions the other input to the AND circuit 92, and it supplies a positive pulse to the counter 12 which advances the counter from the count of 4 to the count of 5. The timing relationships of the signals for causing the AND circuit 92 to perform its add one function are not shown in FIG. 5 in the interest if simplicity. They are similar to the relationships described above with respect to the control stage 21. For a more precise measurement of any time increment such as the one under consideration, additional stages may be provided. For the illustrative example above, however, the counter 13 is not required. Its operation is readily understood from the foregoing description. It is pointed out that the counter 13 is not advanced in the illustrative example. Therefore, when the counting operation is terminated by a positive signal from the AND circuit 44 in FIG. 2, the counter 10 holds the quantity 2, and this represents 200 time units; the counter 11 holds the value 4, and this represents 04 time units; the counter 12 holds the value 5, and this represents 0.05 time units. The operation of the vernier counters 10 through 12 takes place in expanded time. Thus it is seen how the counting systems in FIGS. 1 and 2 operates to measure precisely a time interval which lies between a start pulse on the line 111 in FIG. 1 and a stop pulse on the line 112.

It is pointed out by way of summary that the counting arrangement in FIGS. 1 and 2 is an improved system which uses a single vernier oscillator. The use in the phase coincidence detector 32 of a digital integrator, such as the single shot 120 in FIG. 4, and an analog integrator, such as the condenser 33 and the resistor 134 in FIG. 4, permit the employment of low speed circuits in the construction of the counter system in FIGS. 1 and 2, thereby reducing costs. An additional advantage is the ability to extend the technique to yield additional orders of precision in time measurements. The time interval between the start and stop pulses is defined as real time, and pulses from the oscillator 30 are counted during this period by the counter 10. On receipt of a stop signal the counting in real time stops, and the time interval between the rise of the stop signal and the end of the conversion, as indicated by a positive signal from the AND circuit 44 in FIG. 2, is referred to as expanded time. For example, 100 pulses applied to the counter 11 have the same weight as one pulse applied to the counter 10. In like fashion 100 pulses applied to the counter 12 have the same weight as one pulse applied to the counter 11. The time expansion technique employed in the counting arrangement according to this invention is an improved modification of the vernier oscillator technique employed in earlier systems. In such earlier systems the vernier oscillator operates a counter the value of which is proportional to the phase difference between a main oscillator and the vernier oscillator. The main oscillator is turned on when a start signal is applied, and pulses from this oscillator are used to operate a counter in real time. The vernier oscillator is turned on when a stop signal is applied, and pulses from the vernier oscillator are gated to a different counter until the two oscillator signals become coincident, thereby providing additional interpolation of the last cycle of the main oscillator. The frequency of the vernier oscillator establishes the resolution of the counting system. If the main oscillator uses 10 megahertz and the vernier oscillator uses 10.1 megahertz, for example, this yields a closing rate of 1 nanosecond per cycle. Thus, each pulse of the vernier oscillator represents 1/100 of the time of the main oscillator or 1 nanosecond. At the time of coincidence between the main oscillator and the vernier oscillator, an accuracy of one nanosecond is established. That is, the coincidence signal may have occurred with ± 500 picoseconds of actual coincidence. The vernier technique might be further expanded by using the coincidence signal to turn on a second vernier to repeat the foregoing process until coincidence occurs between the second vernier oscillator and the main oscillator, and the pulses counted during this operation constitute a further definition of the last cycle of the first vernier oscillator or 1/100 of 1 nanosecond. The process may be repeated with additional third, fourth, etc., vernier oscillators.

In the improved arrangement according to this arrangement, however, multiple vernier oscillators are not employed. Instead, the same vernier oscillator is used for each vernierizing operation. The vernier oscillator is stopped upon each detected coincidence with the main oscillator, and after a fixed delay it is restarted. The pulses from the vernier oscillator are supplied to a different counter for each vernierizing operation. Thus it is seen that the arrangement according to this invention provides simplification of the circuitry employed and simplification of calibration. Theoretically, successive reentries in the time expansion technique according to this invention may be repeated as often as required to obtain the desired accuracy. The expansion factor increases exponentially for each reentry. For example, a third reentry using a 10 megahertz main oscillator and a 10.1 megahertz vernier oscillator yield an expansion factor of $100^3$ or 0.1 picosecond resolution. As a matter of practice, however, limits on the number of reentries, and hence the precision of measurements, are determined by the limitations of the circuits employed.

In order to produce a coincidence signal with sufficient precision to allow reentry, the phase coincidence detector 32 must be accurate, and the increased accuracy is obtained by the use of the digital integrator and the analog integrator in the circuit arrangement of FIG. 4. The analog integrator provides an output signal which is proportional to the difference between the two oscillator signals. Only one cycle of this circuit is required to perform a level of time expansion. The output of the analog integrator is used to terminate a given entry by stopping the vernier oscillator and turning it on after a fixed time delay. The digital integrator in FIG. 4 is used to signify the rise of the difference frequency signal.

It provides an initial signal for dropping the output 122 of the detector 32 as soon as a difference signal is present and for maintaining that output in that condition as long as the difference signal pulse train (FIG. 5, E) continues. This insures a stable output at 122 until capacitor 133 has been charged and the analog branch of the detector has achieved stable operation. It will be apparent that any of a wide variety of missing pulse detectors could be employed for this purpose. Single shot 120 is shown as a simple illustration. Details of a specific circuit of this kind are shown, for example, in the IBM Technical Disclosure Bulletin, Vol. 11, No. 11 (Apr. 1969), pages 1512–1513.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for measuring automatically a time interval between first and second pulses,
    the apparatus having a main oscillator and a first counter which counts signals from the main oscillator during said time interval between the first and second pulses, said first pulse serving to turn on the main oscillator,
    vernier oscillator means and a plurality of additional counters for performing successive interpolation operations on any time interval occurring between the last oscillator signal and the second pulse,
    a phase coincidence detector connected to the main oscillator and the vernier oscillator for indicating phase coincidence of the signals from both of said oscillators, and
    switch means connected between the phase coincidence detector, the vernier oscillator means and the additional counters, said switch means operating under control of the phase coincidence detector to connect the vernier oscillator to each of the additional counters in turn for performing successive interpolation operations in each of the additional counters with each successive interpolation operations in each of the additional counters with each successive interpolation operation providing a finer measurement of the fractional time interval remaining after the preceding interpolation operation.

2. The apparatus of claim 1 wherein the switch means includes a ring circuit which is advanced by the phase coincidence detector upon phase coincidence of the main oscillator and the vernier oscillator means, and the vernier oscillator means is connected to each of the additional counters in turn for performing successive interpolation operations.

3. The apparatus of claim 1 wherein the phase coincidence detector includes:
    a digital integrator which responds to overlapped signals from the main oscillator and the vernier oscillator to deactivate the phase coincidence detector, and
    an analog integrator which responds to overlapped signals from the main oscillator and the vernier oscillator to detect phase coincidence of the two oscillators and activate the phase coincidence detector.

4. An apparatus for measuring automatically a time interval between first and second pulses,
the apparatus having a main oscillator and a first counter which counts signals from the main oscillator during the time interval between the first and second pulses,
a vernier oscillator and a plurality of additional counters,
a phase coincidence detector connected to the main oscillator and the vernier oscillator for indicating phase coincidence of the signals from both of said oscillators,
a plurality of control stages, one for each additional counter, means connected each control stage to an associated additional counter,
a switch device connected between the phase coincidence detector, the vernier oscillator and the plurality of control stages, said switch device operating under control of the pulse coincidence detector to connect the vernier oscillator through the control stages to the associated additional counters in turn for performing successive interpolation operations in each of the additional counters.

5. The apparatus of claim 4 wherein the switch device is a ring circuit which is advanced by the phase coincidence detector upon phase coincidence of the main oscillator and the vernier oscillator, and the vernier oscillator is connected through the control stages to the additional counters in turn for performing successive interpolation operations.

6. The apparatus of claim 4 wherein the phase coincidence detector includes:
a digital integrator which responds to overlapped signals from the main oscillator and the vernier oscillator to deactivate the phase coincidence detector, and
an analog integrator which responds to overlapped signals from the main oscillator and the vernier oscillator to detect phase coincidence of the two oscillators and activate the phase coincidence detector.

7. The apparatus of claim 6 wherein the digital integrator is missing pulse detector comprising a single shot, and the analog integrator is a condenser and a resister connected in parallel.

8. An apparatus for measuring automatically a time interval between first and second pulses,
the apparatus including a main oscillator, a first control stage connected to the main oscillator, and a first counter connected to said first control stage, said control stage and said oscillator being operated by the first pulse to supply pulses from the main oscillator to said first counter whereby said first counter is operated in real time,
a vernier oscillator, a plurality of additional control stages, means connecting the vernier oscillator to each of said additional stages,
a plurality of additional counters, means connecting said additional control stages to said additional counters,
means responsive to the second pulse for starting the vernier oscillator, activating the first of said plurality of additional control stages, and deactivating said first control stage,
a phase coincidence detector connected to the main oscillator and the vernier oscillator for indicating phase coincidence of the two oscillators, a ring circuit connected to the plurality of additional control stages, said phase coincidence detector having an output line connected to said vernier oscillator, said additional control stages, and said ring circuit for stopping the vernier oscillator, deactivating said additional control stages, and advancing said ring circuit whenever said phase coincidence detector detects coincidence of the main oscillator and the vernier oscillator, means connecting the ring circuit to the vernier oscillator for starting the vernier oscillator each time the ring circuit is advanced, delay means connected in series with the ring circuit for delaying the start of said vernier oscillator, said ring circuit operating a given one of the additional control stages each time it is advanced by the phase coincidence detector, whereby the additional control stages are operated in turn,
means responsive to the operation of the last of said plurality of additional control stages for stopping the main oscillator.

9. The apparatus of claim 8 wherein the phase coincidence detector includes:
a digital integrator which responds to overlapped signals from the main oscillator and the vernier oscillator to deactivate the phase coincidence detector, and
an analog integrator which responds to overlapped signals from the main oscillator and the vernier oscillator to detect phase coincidence of said main and vernier oscillators and activate the phase coincidence detector.

10. The apparatus of claim 9 wherein the digital integrator is a single shot, and the analog integrator is a condenser and a resistor connected in parallel.

11. The apparatus of claim 10 wherein the digital integrator includes a flip-flop having one and zero inputs, said single shot having an output line connected to the one input of the flip-flop,
a differential amplifier having two inputs, means connecting the analog integrator to one of said inputs, a fixed source of bias potential connected to the other input of said differential amplifier, said differential amplifier having an output connected to the zero input of said flip-flop, said flip-flop having a zero output line connected to said vernier oscillator and said control stages for stopping said vernier oscillator and deactivating said control stages.

12. The apparatus of claim 11 wherein the phase coincidence detector includes an AND circuit connected to receive signals from the main oscillator and the vernier oscillator, and said AND circuit having an output line connected to said single shot and said analog integrator.